United States Patent [19]
Bell, Jr.

[11] Patent Number: 5,119,352
[45] Date of Patent: Jun. 2, 1992

[54] MAGNETO OPTIC DATA STORAGE READ OUT APPARATUS AND METHOD

[75] Inventor: Bernard W. Bell, Jr., Boise, Id.

[73] Assignee: Hewlett-Packard Company, Palo Alto, Calif.

[21] Appl. No.: 568,916

[22] Filed: Aug. 17, 1990

[51] Int. Cl.⁵ .......................... G11B 11/00; G11B 7/00
[52] U.S. Cl. .................................... 369/13; 369/44.12; 369/44.14; 369/44.23
[58] Field of Search ................... 369/13, 14, 15, 44.12, 369/44.14, 110, 112; 360/59, 114

[56] References Cited

U.S. PATENT DOCUMENTS

| | | | |
|---|---|---|---|
| 4,397,527 | 8/1983 | Geyer | 369/112 |
| 4,654,839 | 3/1987 | Endo | 369/13 |
| 4,682,311 | 7/1987 | Matsubayashi et al. | 369/13 |
| 4,721,368 | 1/1988 | Deguchi et al. | 369/13 |
| 4,729,122 | 3/1988 | Itoh | 369/13 |
| 4,774,615 | 9/1988 | Revelli et al. | 369/110 |
| 4,785,438 | 11/1988 | Mizunoe | 369/13 |
| 4,815,058 | 3/1989 | Nakamura et al. | 369/112 |
| 4,823,220 | 4/1989 | Milster et al. | 369/110 |
| 4,888,752 | 12/1989 | Arai | 369/44.23 |
| 4,953,124 | 8/1990 | Koyama | 369/13 |
| 4,959,821 | 9/1990 | Morimoto et al. | 369/13 |

FOREIGN PATENT DOCUMENTS

| | | | |
|---|---|---|---|
| 0093650 | 5/1985 | Japan | 369/110 |
| 0173328 | 7/1989 | Japan | 369/110 |

Primary Examiner—Stuart S. Levy
Assistant Examiner—Tan Nguyen
Attorney, Agent, or Firm—E. F. Oberheim

[57] ABSTRACT

A magneto optical head assembly combining a single high extinction polarizing beam splitter utilized to separate and analyze a light beam, a pair of half-wave plates, each having a fast axis with respect to the polarization direction of light transmitted through the head assembly, with the angle of the fast axis of one of the half-wave plates preferably being equal but opposite that of the angle of the fast axis of the remaining half-wave plate. The light beam is transmitted through the head assembly polarizing beam splitter to be polarized with one half of the transmitted polarized light passing through one of the half-wave plates and the remaining half of the transmitted polarized light passing through the other half-wave plate. The portion of the transmitted polarized light which passes through each half-wave plate is rotated about the fast axis of each plate and focused upon a point on a magnetic recording medium. The light is reflected off the magnetic recording medium, with its attendant Kerr rotation, back through the other half-wave plate into the polarizing beam splitting portion of the head assembly. The beam splitter directs a portion of the reflected light beam to a pair of photo detectors. The polarizing output signals of these detectors are coupled into a differential amplifier where the common signal components cancel, leaving only the Kerr rotation signals component which is indicative of the magnetization state of that point on the magnetic recording medium where the light is focused.

12 Claims, 10 Drawing Sheets

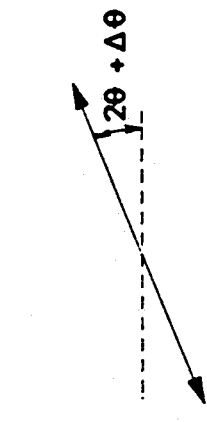
FIG. 6d
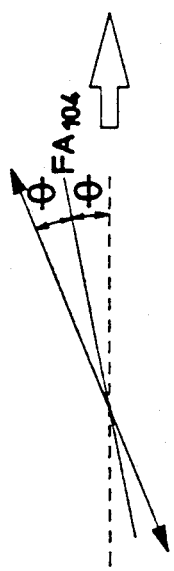
FIG. 6c
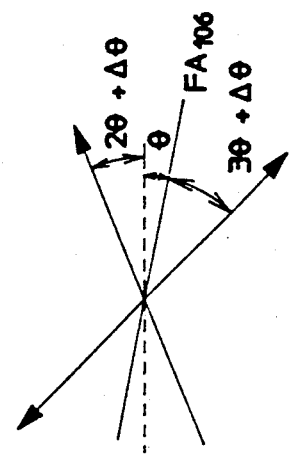
FIG. 6e
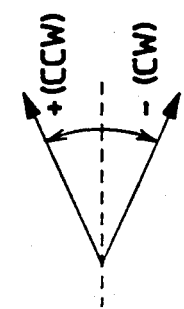
FIG. 6a
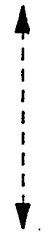
FIG. 6b
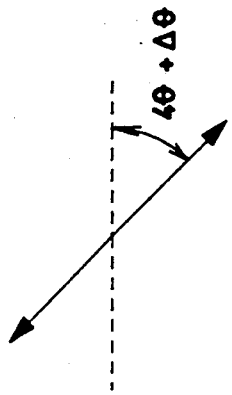

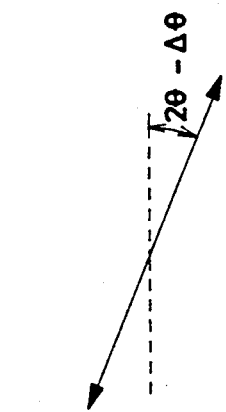
FIG. 7i
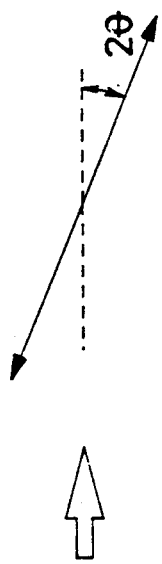
FIG. 7h
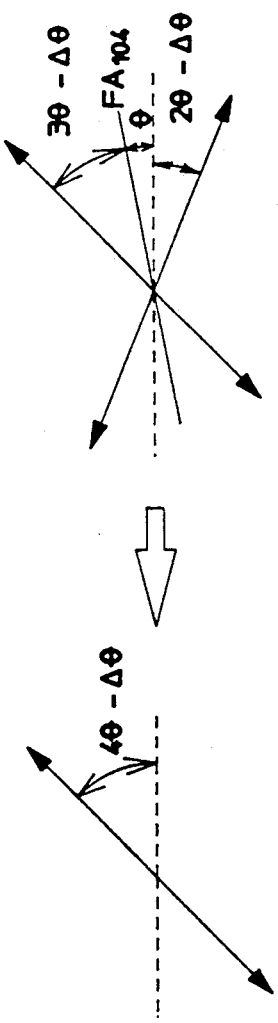
FIG. 7j
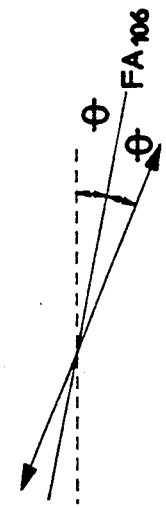
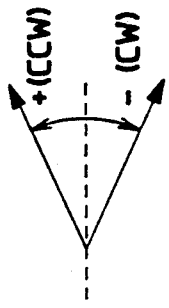
FIG. 7f
FIG. 7g

MAGNETO OPTIC DATA STORAGE READ OUT APPARATUS AND METHOD

BACKGROUND OF THE INVENTION

1. Field of the Invention

The present invention relates to the field of optical and magneto-optical information storage systems and, more particularly, to a composite optical assembly for applying a light spot to information storage media and retrieving information from the media optically.

2. Description of the Prior Art

Information storage systems, particularly those used with computer systems, typically store data magnetically or optically on to several types of storage media, rotating magnetic or optical disks for example. Such storage media may include information for document files, computer output memories and the like which are used for recording and retrieval only, or media which permits recording, retrieval or erasure of information. The data stored on such media, whether magnetic or optical is contained within a series of tracks. Once formatted on a disk, such tracks are spiral or concentric about the disk center and may number in the thousands of tracks per disk side. The total number of tracks enhance the storage capacity of the disk and depends upon the diameter of the disk utilized and the method of recordization, either magnetically or optically, of the data.

In both magnetic recording and magneto-optical recording, information is stored on a storage disk by orientating the magnetization of the media at given points along the tracks. In order to access these tracks in order to record and/or read data on a disk, a read/write head or transducer for magnetic recording or an optical assembly for optical recording, comprising at least a spot forming mechanism in the case of optical recording, is moved along a generally radial path across the surface of the storage disk a the storage disk is being rotated. The generally radial movement of the transducer or optical assembly will follow a straight line path or an arcuate path, depending upon whether a linear or rotary actuator is utilized to position the head.

In magnetic-optical recording, information is encoded and is stored in a sequence of magnetic domains oriented normal to the storage media surface in either of two possible orientations, north pole up or north pole down for example.

In an optical and/or magneto-optical media reading apparatus, an optical assembly is employed which applies the light spot to the data storage media. In this optical assembly a laser beam typically generated by semiconductor laser or other suitable light source can be focused on this storage medium by an objective lens and is reflected by the media. The laser beam when reflected from the media passes through the objective lens and is then detected by a photo detector or other suitable detector. The detected signal is then processed to extract the information as reproduced by the magneto-optical effect, particularly the Kerr effect, the phenomenon that the plane of polarization of a linearly polarized light beam is rotated when the light beam is reflected from the surface of a suitable magnetic recording medium.

The basic construction of a magneto-optical disk apparatus according to the prior art is shown in the magneto-optical information reading apparatus depicted in FIG. 1 which comprises a means for causing a light beam ($I_0$) to be polarized in a predetermined direction by passing the beam through a polarizing plate 10, through a half mirror 20, onto a magnetic recording medium 30, reflecting the beam therefrom back to the half mirror 20 where a portion of the beam is directed out through an analyzer 40 into a photodectector 50.

Another example of the prior art but incorporating differential detection of the reflected signal is shown in FIG. 2 of the accompanying drawings. In FIG. 2 a light beam emitted from a semiconductor laser 60 is linearly polarized in the direction of peak polarization and is then collimated by collimating lens 62 and then passes through beam splitter 64 (either the half mirror amplitude type or the so called leaky beam splitter type). The light beam is imaged as a minute spot on the magneto-optical recording medium 66, by objective lens 65. When a magnetic domain is formed on the media 66, as shown in FIG. 2, the light beam reflected from the medium 66 is subjected to a rotation in the plane of polarization of $\pm\Theta_k$ caused by the Kerr effect in conformity with whether the direction of magnetization of the domain is upwards or downwards.

The magneto-optically modulated reflected light is again collimated by object lens 65 and reflected by half mirror 64, whereafter it is optically formed into a convergent light beam by the condensing lens 68 which is divided by half mirror amplitude beam splitter 70 with the divided light then passing through analyzers 72, 74 respectively to be detected as intensity modulated light beams 76, 78 by photo detectors 80, 82.

SUMMARY OF THE INVENTION

It is one object of the present invention to further improve the above described prior art and to provide a magneto-optical information reproducing apparatus which is simple in construction and capable of reproducing magneto-optical signals of acceptable signal-to-noise ratios by the use of a single polarizing beam splitter, utilizing the beam splitter to both separate and analyze the light.

It is another object of the present invention to further improve the prior art by efficiently utilizing the light from the source such that more of it is through put to the media and less is lost, by the use of a single polarizing beam splitter whose transmission can be very high for the polarization state it transmits. The optical head thus produced will have a higher overall light efficiency.

The above mentioned objects of the present invention are achieved by providing a magneto-optical information reproducing apparatus having a high extinction polarizing beam splitter through which a light beam is passed and providing a pair of wave plates having a predetermined retardance of nominally one half wave length, each positioned to receive half of the light transmitted through and polarized by the beam splitter and each having a fast axis making a predetermined angle "Θ" with respect to an axis along the direction of transmission of the light through the beam splitter. The angle formed by the fast axis with respect to the axis along the direction of light transmission through one half wave plate is opposite the angle formed by the fast axis with respect to the direction of transmission of the light beam through the other half wave plate.

The light beam is transmitted through the beam splitter where the beam is polarized, thereafter passing through the wave plates to be rotated nominally about the fast axis of each. The beam is then reflected off of the magnetic recording medium, each portion passing through the other wave plate where it is again rotated nominally about the fast axis of the wave plates. The rotated, reflected light passes from the wave plates into the beam splitter where a component of the beam is directed into a pair of photo detectors. The output of these detectors are coupled into a differential amplifier where the common components cancel out leaving only a signal caused by the magneto-optic Kerr angle of rotation of the beam resulting from the reflection of light off the magnetic media. This signal is indicative of the magnetization state of the magnetic domains of the magnetic media whereby information may be retrieved from the media.

BRIEF DESCRIPTION OF THE DRAWINGS

FIGS. 6a–6e are vector representations of the polarization and rotation at different points along the light beam of FIG. 6.

FIG. 7f–7j are vector representations of the polarization and rotation at different points along the light beam of FIG. 7.

DESCRIPTION OF THE PREFERRED EMBODIMENT

Figure 1:
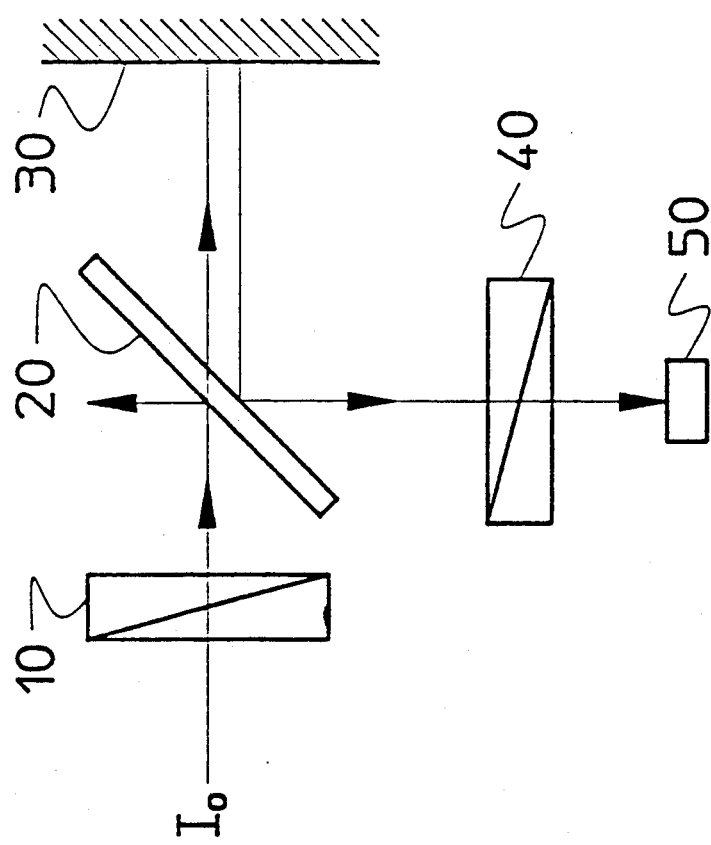
FIG. 1 is schematic view showing an example of a magneto-optical information reading apparatus according the prior art.
Figure 2:
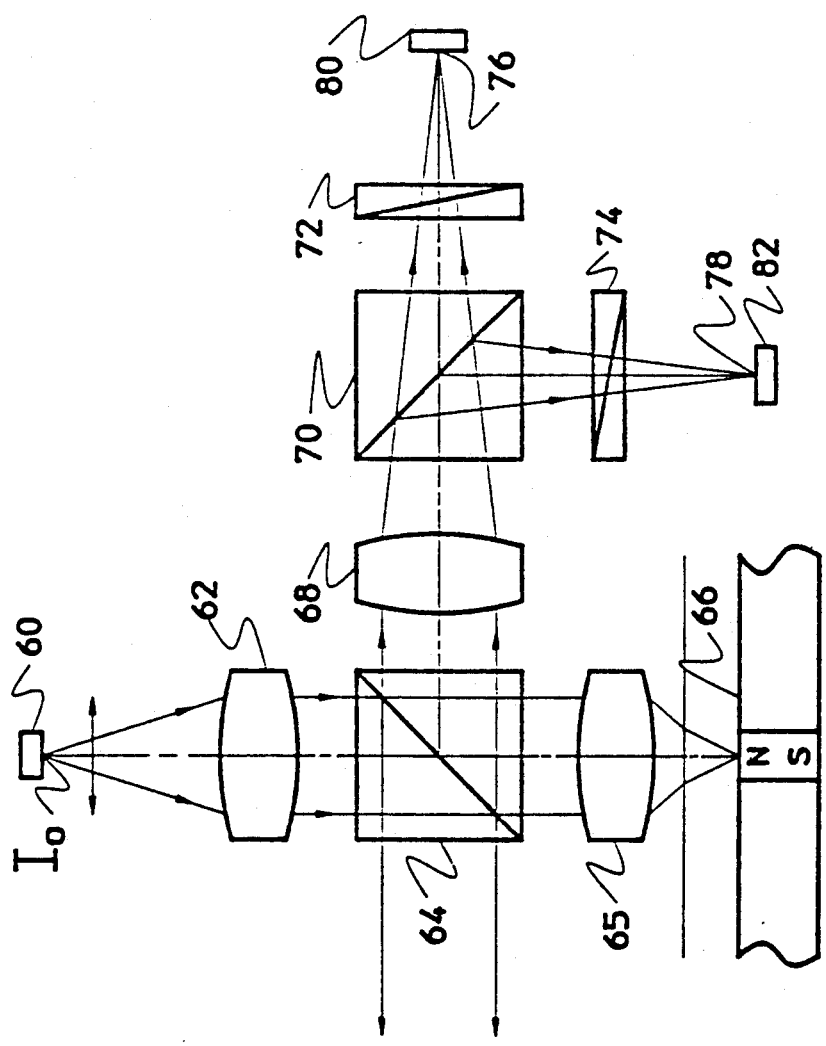
FIG. 2 is a schematic view showing an example of a magneto-optical information reproducing apparatus having differential detection means according to the prior art.
Figure 3A:
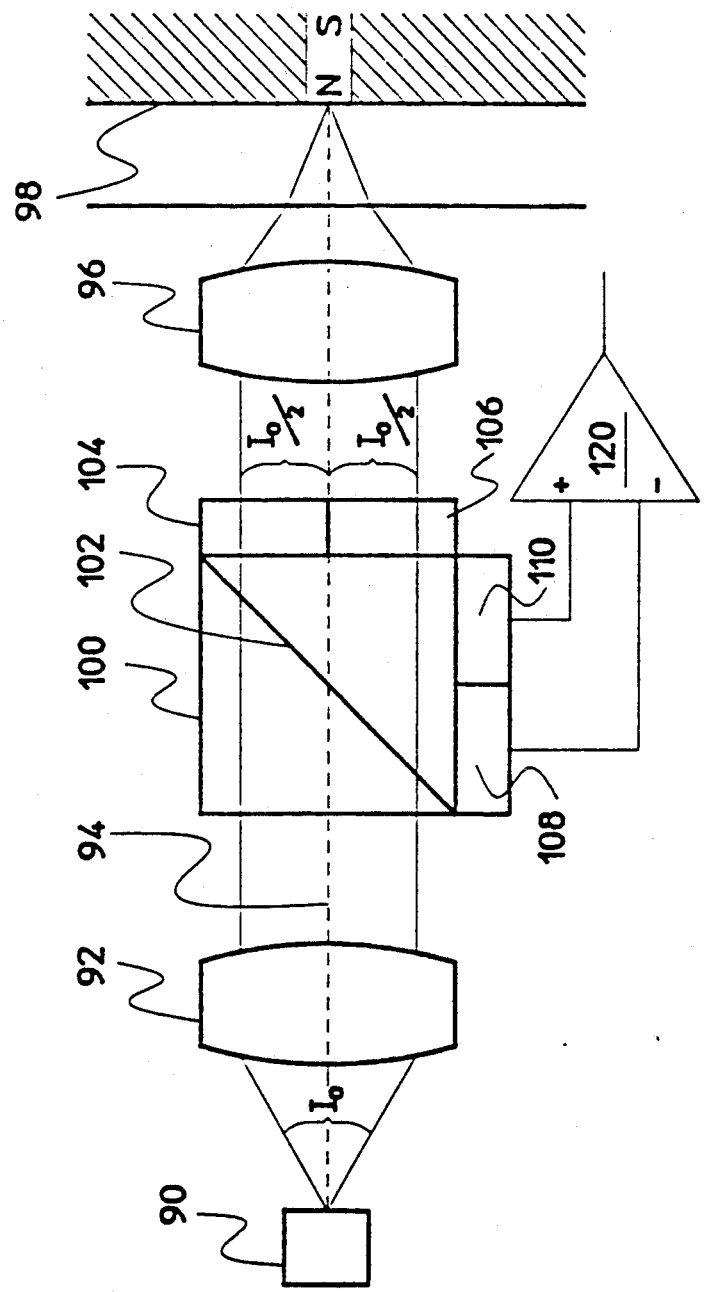
FIG. 3A is a schematic view showing an magneto-optical detection apparatus according to an embodiment of the present invention.

Referring now to FIG. 3A, which is a schematic view showing an embodiment of the magneto-optical information reading apparatus of the present invention, a light beam $I_0$ is emitted from a laser diode source 90 and coupled into a waveguide structure. The light beam $I_o$ which is polarized mainly in the direction of transmission of a high extinction polarizing beam splitter 100, forming part of the waveguide structure, passes along an axis 94 to a magnetic recording medium 98, through a collimating lens 92, through a high extinction polarizing beam splitter 100, through a pair of wave plates 104 and 106, (first and second light dividing means as used in the claims) through an objective lens 96 to focus on the magnetic recording medium 98. The wave plates 104 and 106 have relative retardances, say $\lambda/2$, between light polarized in the direction of the fast axis and the slow axis, respectively, the predetermined angular orientation of these wave plates being defined by the angles $\Theta$ of the fast axes, $FA_{104}$ and $FA_{106}$, with respect to the light transmission axis, FIGS. 6c and 7h. The light beam is reflected from the magnetic recording medium 98 back through the objective lens 96 through the wave plates 104 and 106 and into the high extinction polarizing beam splitter, where components of the light beam are reflected at the interface 102 out of the beam splitter onto photo detectors 108 and 110, each having an output coupled into a differential amplifier 120 where the signals are compared to produce an output indicative of the magnetization state at the surface of magnetic recording media 98 as seen in FIGS. 6c and 7h, in reference to the fast axes $FA_{104}$ and $FA_{106}$, the predetermined angular orientation of the wave plates is shown for that case in which the angles $\Theta$ of these fast axes are preferably equal. Where the retardance of the wave plates are unequal, for example where one wave plate is zero, the fast axis of that wave plate is undefined and there is no phase shift.

Figure 3B:
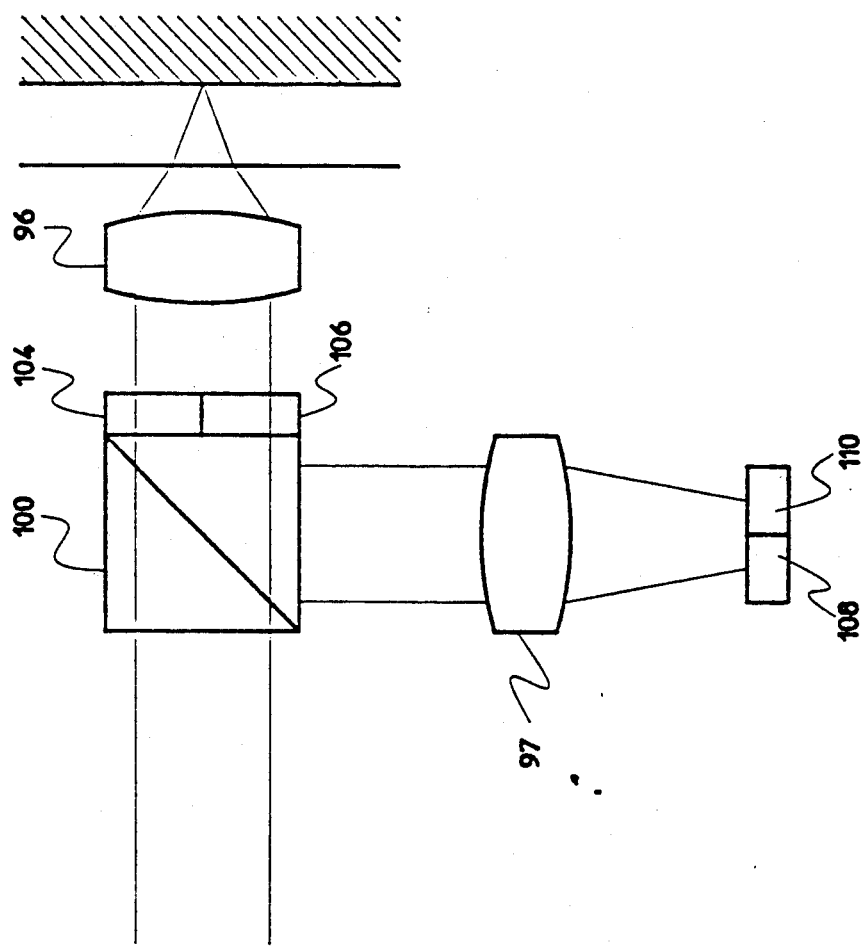
FIG. 3B is an alternate embodiment of the schematic view of 3A.

Referring now to FIG. 3B it may be seen that a converging lens 97 has been interposed between beam splitter 100 and detectors 108, 110. Lens 97 permits precise control over the light beam incident on detectors 108, 110 for purposes hereinafter described in conjunction with FIG. 4.

Figure 4:
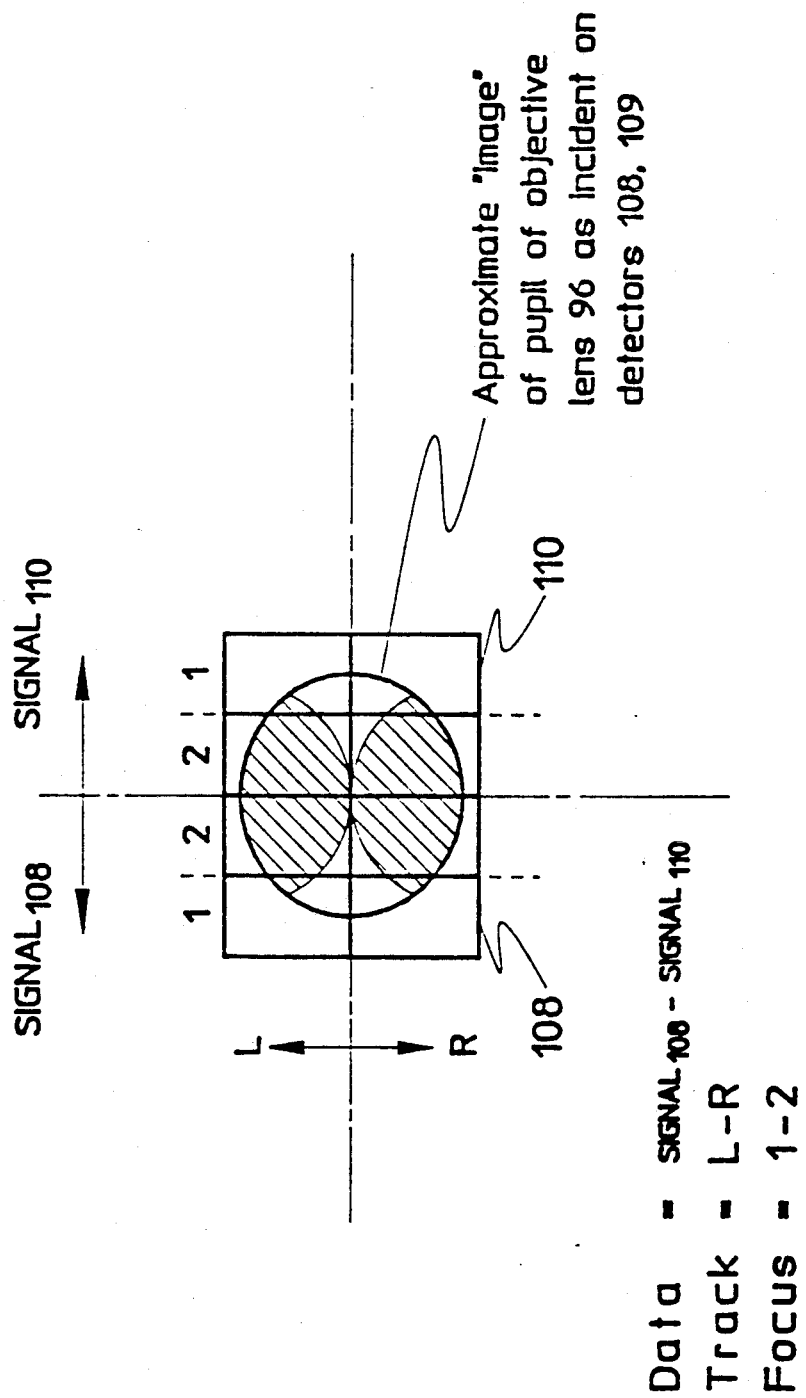
FIG. 4 is a view of one embodiment showing a segmented detector used for extracting data, tracking and focus information in the present invention.

Referring now to FIG. 4, detector 108, 110 detectors 108, 110 may be constructed to provide not only data retrieval but tracking and focus information as well. An example of such detectors, as shown in FIG. 4, in which each detector 108, 110 is divided into four quadrants, shown as L1, L2, R1 and R2. As will be hereinafter explained, data is retrieved by comparing the signals produced by the incident light on the whole of detector 108 with the signals produced by the incident light by the incident light on the whole of detector 110. Tracking information may also be obtained by subtracting the signal produced by the incident light on the 'R' portion of the detectors 108 or 110 from the signal produced by the incident light on the 'L' portion of the detectors 108 or 110. Further, by comparing the signal produced by the incident light on portions 1 and 2 of the detector, a signal may be generated for use in a servo system to focus the beam incident on the magnetic domains of the medium 98.

This information for tracking and focusing derived by comparing the signals from portions L, R and 1, 2 (respectively) of a detector 108 may be added to the comparable information from the other detector 110 if desired, for better rejection of servo noise induced by polarization effects and to produce larger servo signals.

This type of segmented detector construction and others not shown permits using a single photodetector die with multiple portions to provide all the necessary data and servo information thus contributing to a lower cost, more compact and lighter weight optical head.

Figure 5:
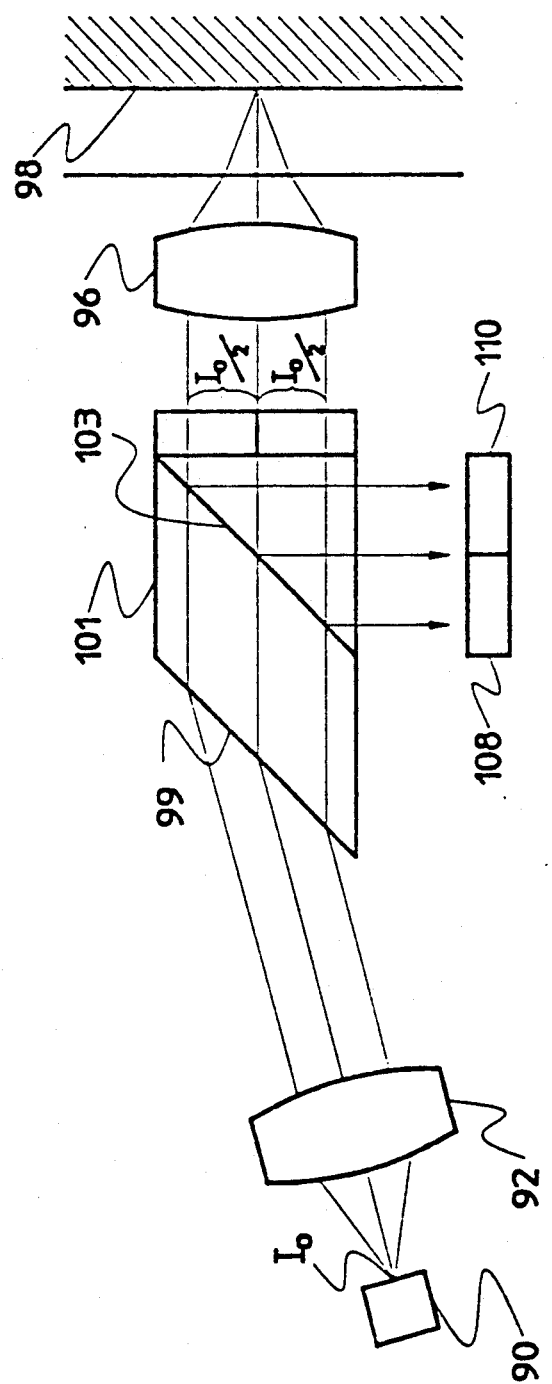
FIG. 5 is a schematic view of a alternate embodiment of the present invention.

Referring now to FIG. 5, an alternate embodiment of the invention is depicted when the cube type beam splitter 100 of FIG. 3 has been replaced with a slab or wedge type beam splitter 101.

Generally, the light beam $I_0$ emitted from source 90, after passing through collimating lens 92, has an elliptical cross-section. By altering the geometry, such that the angle the beam makes with surface 99 of beam splitter 101 is no longer nearly 0, the light beam can be refracted into a beam having an approximately circular irradiance cross-section. This would allow, for instance, more symmetrically filling the aperture of objective lens 96 and more efficient use of the laser power.

Figure 6:
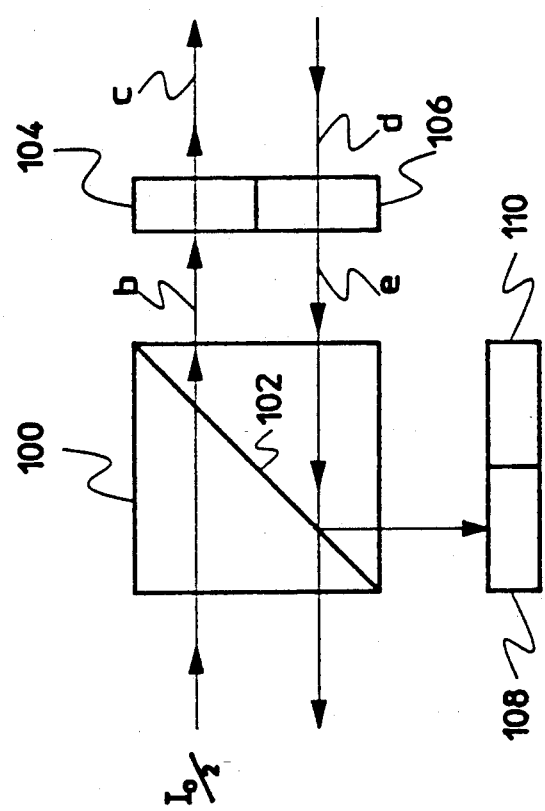
FIG. 6 is a schematic view showing the path of the transmitted and reflected light beam reaching one of the photo detectors of the present invention.

In operation, and referring now to FIG. 6 and 6a-e, with the chosen sign convention, + or −, as shown in 6a, a light beam having an intensity, $I_0$ is transmitted along a transmission axis through a polarizing beam splitter 100 where it is linearly polarized in a predetermined direction as shown in FIG. 6b with one half of the polarized light beam being transmitted into the wave plate 104 which has a nominal retardance value providing a phase shift of ($\lambda/2$). The wave plate retardance has a fast axis ($FA_{104}$) orientation angle "$\Theta$" with respect to the transmission axis of the linearly polarized light beam. The transmitted light passing through wave plate 104 is rotated such that the polarized light is rotated an angle "$\Theta$" about the fast axis as shown in the left hand portions of FIG. 6c, giving a resultant rotation with respect to the direction of transmission of $2\Theta$ as shown in the right hand portion of FIG. 6c, as viewed from the media. As the wave plate is positioned to receive only half of the light passing through the polarizing beam splitter 100, the light reaching magnetic recording medium via wave plate 104 is now $I_0/2$ linearly polarized at an angle of "$2\Theta$" with respect to the direction of polarized light transmission. Upon reflection from the media surface 98, and now defining the magnetization state of the individual magnetic domain having a north magnetic pole nearest to the surface of the media to be a positive magnetization state ($+M$) and further defining the Kerr rotation due to reflection of light incident upon a positive magnetization domain to be a ($+\Delta\Theta$) rotation (CCW), the light reflected off of the magnetic domain is given as $R(I_0/2)$ rotated by the angle of ($2\Theta + \Delta\Theta$) about the direction of transmitted light as shown in FIG. 6d. The reflected light then passes back through the other wave plate 106 where the reflected light beam is rotated about the fast axis ($FA_{106}$) of half wave plate 106, as shown in FIG. 6e, such that the resultant reflected beam is given as $R(I_0/2)$ at an angle of ($4\Theta + \Delta\Theta$) with respect to the transmission axis. The reflected light then passes into the polarizing beam splitter 100 where a component of the reflected light beam is reflected at the interface 102 and is directed onto detector 108. This component of the reflected light beam is given as $R(I_0/2) \cos^2(\pi/2 - (4\Theta + \Delta\Theta))$ which translates to the light incident on detector 108 for a ($+M$) media state being equal to $R(I_0/2) \sin^2(4\Theta + \Delta\Theta)$. Likewise, it may be seen that the light incident on detector 108 for a negative magnetization state ($-M$) is equal to $R(I_0/2) \sin^2(4\Theta - \Delta\Theta)$.

Figure 7:
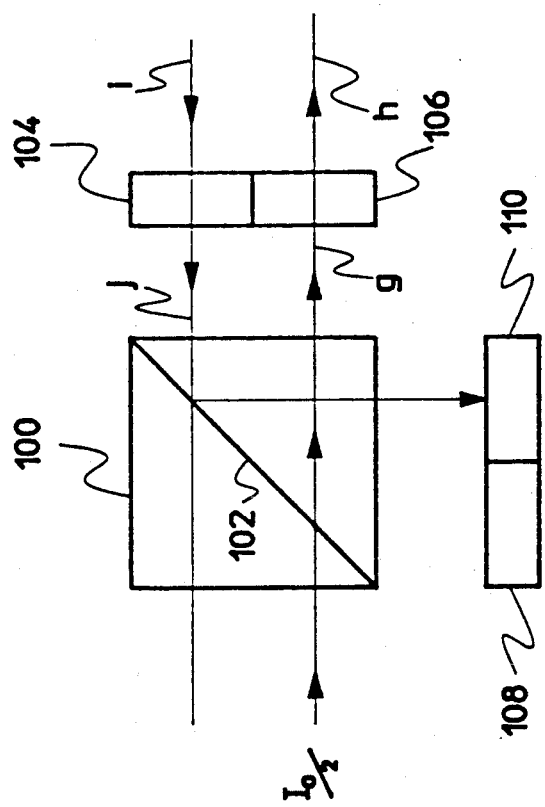
FIG. 7 is a schematic view showing the path of the transmitted and reflected light beam reaching the other photo detector of the present invention.

Referring now to FIG. 7, and FIG. 7f-j it is seen that an occurrence similar to that of the light passing through wave plate 104, takes place when the incident light $I_0$ passing through the polarizing beam splitter as shown by FIG. 7g into wave plate 106 is rotated in a negative $\Theta$ direction (CW) FIG. 7f, about the fast axis $FA_{106}$ of the wave plate 106, shown by FIG. 7h, such that the light reaching the media through wave plate 106 has a intensity of ($I_0/2$) and a rotation of ($-2\Theta$). Again, now referring to FIG. 7i, assuming a positive magnetization ($+M$), the reflected light is shown to have a magnitude of $R(I_0/2)$ and an angle of rotation with respect to axis of transmission of $[-(2\Theta - \Delta\Theta)]$. Passing the reflected light through wave plate 104, the light is also rotated about the fast axis of the wave plate so that it forms an angle of ($4\Theta - \Delta\Theta$) with respect to the axis of transmission and with an amplitude of $R(I_0/2)$ as shown by FIG. 7j. Again, the portion of the light reflected by the high extinction beam splitter is given as $R(I_0/2) \cos^2(\pi/2 - (4\Theta - \Delta\Theta))$ such that the amount of light falling on detector 110 for a positive magnetization state, ($+M$), may be defined as $R(I_0/2) \sin^2(4\Theta - \Delta\Theta)$. Similarly, for a negative magnetization state ($-M$) the amount of light falling on detector 110 is defined as $R(I_0/2) \sin^2(4\Theta + \Delta\Theta)$.

Thus the positive magnetization state ($+M$) may be defined as the signal out of the detector 108 minus the signal out of the detector 110, which can be expressed as $R(I_0/2) [\sin^2(4\Theta + \Delta\Theta) - \sin^2(4\Theta - \Delta\Theta)]$ which, by trigonometric identity, is equal to $R(I_0/2) [\sin(8\Theta) \sin(2\Delta\Theta)]$.

Similarly, a negative magnetization state ($-M$) may be defined as the signal from detector 108 in a negative magnetization state minus the signal from detector 110 in a negative magnetization state and which may be expressed as being equal to $R(I_0/2) [\sin^2(4\Theta - \Delta\Theta) - \sin^2(4\Theta + \Delta\Theta)]$ which by trigonometric identity equals $R(I_0/2) [-\sin(8\Theta) \sin(2\Delta\Theta)]$. Thus the level change in the differentially detected signal caused by reversal of the magnetization state between adjacent magnetic domains on the media may be determined by taking the difference between the expressions for ($+M$) and ($-M$) states such that the change in signal level is given by the equation:

$$\begin{aligned} \text{change in signal level} &= (+M) - (-M) \\ &= [RI_0/2 \,(\sin(8\Theta)\sin 2\Delta\Theta)] - \\ &\quad [RI_0/2(\sin(8\Theta)\sin(-2\Delta\Theta))] \\ &= RI_0 \sin 8\Theta \sin 2\Delta\Theta \end{aligned}$$

Accordingly, it is seen that for the proper choice of $\Theta$ the various embodiments of the present invention provide for accurately determining the magnetization states on a magnetic-optical recorded medium thereby permitting retrieval of the information stored thereon.

The invention as above described is by way of explanation directed toward a preferred embodiment which is not to be construed as a limitation of the scope of the invention.

What is claimed is:

1. In a magneto-optic information recording and reproducing system having light transmitted between a source and a magneto-optic recording medium having magnetic states indicative of data stored thereon, the light being reflected from the magneto-optic recording medium toward the source, the improvement comprising:

means for polarizing the transmitted light beam in a predetermined direction;

first and second wave plates positioned between the polarizing means and the magneto-optic recording medium such that a separate light beam portion of the transmitted polarized light beam passes through each wave plate, is reflected from the magneto-optic recording medium and passes back through the other wave plate, each of said first and second wave plates effecting rotation of the separate portions of the polarized light beam a predetermined angle in opposite direction with respect to said predetermined direction of polarization on both transmitted and reflected passages of the separate light beam portions therethrough;

first and second detector means;

said polarizing means further operative to direct a portion of each of the separate light beam portions of the of the light reflected from the magneto-optic recording medium and, respectively, passed through the first and second wave plates, in substantially the same direction, to said first and second detector means respectively;

comparator means, and each detector means having an output coupled to said comparator means to compare said outputs to determine the magnetization state of data recorded on the magneto-optic recording medium.

2. The apparatus of claim 1 where the polarizing means is a polarizing beam splitter.

3. The apparatus of claim 1 comprising a waveguiding structure in which said polarizing means and said wave plates form an integral part;

said waveguiding structure positioned to receive the light from the source and guide it toward the magneto-optic recording medium.

4. The apparatus of claim 1 in which each of the first and second wave plates has a fast axis with a predetermined angle between each fast axis and said predetermined polarization direction of transmission of the light beam.

5. The apparatus of claim 4 comprising a waveguiding structure in which said polarizing means and said first and second wave plates form an integral part;

said waveguiding structure positioned to receive the light from the source and guide it toward the magneto-optic recording medium.

6. The apparatus of claim 4 in which each of the first and second wave plates has a fast axis forming an angle of $(+\Theta)$ and $(-\Theta)$ respectively with respect to said predetermined polarization direction of transmission of the light beam.

7. The apparatus of claim 4 in which each of the first and second wave plates has a retardance nominally providing a phase shift of $\lambda/2$.

8. The apparatus of claim 5 in which each of the first and second wave plates has a retardance nominally providing a phase shift of $\lambda/2$.

9. The apparatus of claim 4 in which the retardance of the first wave plate is nominally zero, and the second wave plate has a non zero retardance and a fast axis of a predetermined angle other than zero with respect to said predetermined polarization direction of transmission of the light beam.

10. The apparatus of claim 9 in which the second wave plate has a nominal retardance providing a phase shift of $\lambda/2$.

11. The apparatus of claim 10 comprising a waveguiding structure in which said polarizing means and the first and second said wave plates form an integral part;

said waveguiding structure positioned to receive the light from the source and guide it toward the recording medium.

12. In a magneto-optic information recording and reproducing system having light transmitted in a path along a transmission axis between a source and a magneto-optic recording medium, the magneto-optic recording medium having discrete magnetic states indicative of data stored thereon, an improved method of retrieving the information comprising:

polarizing the transmitted light in a predetermined direction with respect to said transmission axis;

rotating separate light beam portions of the polarized transmitted light beam in opposite directions a predetermined angle with respect to said predetermined direction;

directing said separate light beam portions to said magneto-optic media, rotating said separate light beam portions which are reflected from the media in opposite directions a predetermined angle with respect to said predetermined direction;

producing separate electrical signals from the separate light beam portions which are reflected from the media and rotated; and comparing the separate electrical signals to determine the magnetization state of the data recorded on the magneto-optic recording medium.

* * * * *